United States Patent
Liu et al.

(10) Patent No.: US 11,939,430 B2
(45) Date of Patent: Mar. 26, 2024

(54) METHODS FOR THE CONTINUOUS POLYMERIZATION OF PHOSPHATE COMPOUNDS TO FORM POLYPHOSPHATE COMPOSITIONS

(71) Applicant: J.M. Huber Corporation, Atlanta, GA (US)

(72) Inventors: Yue Liu, Marietta, GA (US); Aleksey Isarov, Kennesaw, GA (US); Robin Brumby Helms, Ranger, GA (US); Yann Charlotte Bourgeois, Nivelles (BE); James Scott Thomas, Cumming, GA (US); Christopher Lamar Duck, Canton, GA (US); Patrick Christopher Farrell, Cartersville, GA (US)

(73) Assignee: J.M. Huber Corporation, Atlanta, GA (US)

( * ) Notice: Subject to any disclaimer, the term of this patent is extended or adjusted under 35 U.S.C. 154(b) by 464 days.

(21) Appl. No.: 17/194,373

(22) Filed: Mar. 8, 2021

(65) Prior Publication Data
US 2021/0332192 A1 Oct. 28, 2021

Related U.S. Application Data

(60) Provisional application No. 63/014,740, filed on Apr. 24, 2020.

(51) Int. Cl.
C08G 79/04 (2006.01)
(52) U.S. Cl.
CPC .................. C08G 79/04 (2013.01)

(58) Field of Classification Search
CPC ...................................................... C08G 79/04
(Continued)

(56) References Cited

U.S. PATENT DOCUMENTS 3,300,196 A 1/1967 Bendy
6,136,973 A 10/2000 Suzuki et al.
(Continued)

FOREIGN PATENT DOCUMENTS

CN 108383097 A * 8/2018 ........... C01B 25/405
DE 102015009598 1/2017
(Continued)

OTHER PUBLICATIONS

Hu et al., CN 108383097 A machine translation in English, Aug. 10, 2018. (Year: 2018).*
(Continued)

*Primary Examiner* — David T Karst
(74) *Attorney, Agent, or Firm* — Merchant & Gould P.C.

(57) ABSTRACT

Polyphosphate compositions are produced by a process that includes the steps of continuously introducing a phosphate compound into a polymerization vessel, polymerizing the phosphate compound at a temperature of 250-450° C. for a time period sufficient to form the polyphosphate composition, and continuously discharging the polyphosphate composition from the polymerization vessel. The phosphate compound can be fed to the polymerization vessel in the form of an aqueous slurry containing 5-50 wt. % of the phosphate compound. Resulting polyphosphate compositions often contain at least 8 wt. % of a polyphosphate and less than 35 wt. % of the phosphate compound.

22 Claims, 4 Drawing Sheets

(58) Field of Classification Search
USPC .......................................................... 528/399
See application file for complete search history.

(56) References Cited

U.S. PATENT DOCUMENTS

| | | |
|---|---|---|
| 9,493,353 B2 | 11/2016 | Harada et al. |
| 9,505,793 B2 | 11/2016 | Wehner |
| 10,221,301 B2 | 3/2019 | Leistner et al. |
| 10,351,776 B2 | 7/2019 | Kostler et al. |
| 2016/0137678 A9 | 5/2016 | Wehner |

FOREIGN PATENT DOCUMENTS

| | | |
|---|---|---|
| EP | 0725065 | 8/1996 |
| EP | 3339246 | 6/2018 |
| JP | 2001026597 | 1/2001 |
| WO | WO99/08962 | 2/1999 |
| WO | WO 2006/109354 | 10/2006 |

OTHER PUBLICATIONS

Le Capitaine, Direct Fired Rotary Kiln vs. Indirect Fired Rotary Kiln vs. What's the Difference?, Feeco International, Aug. 18, 2014, 4 pages.

International Search Report and Written Opinion of International Application No. PCT/US2021/021317, dated Jun. 11, 2021, 19 pages.

* cited by examiner

METHODS FOR THE CONTINUOUS POLYMERIZATION OF PHOSPHATE COMPOUNDS TO FORM POLYPHOSPHATE COMPOSITIONS

REFERENCE TO RELATED APPLICATION

This application claims the benefit of U.S. Provisional Application Ser. No. 63/014,740, filed on Apr. 24, 2020, the disclosure of which is incorporated herein by reference in its entirety.

FIELD OF THE INVENTION

The present invention generally relates to the preparation of polyphosphate compositions that can be used as flame retardants, and more particularly, to the continuous polymerization of certain phosphate compounds to form the polyphosphate compositions.

BACKGROUND OF THE INVENTION

Various polyphosphates can be used in polymer-based formulations as flame retardant additives. However, the production of these polyphosphates is limited to solid phosphate feed materials and is constrained by polymerization processes and equipment that suffer from poor operational efficiency. Thus, the present invention is principally directed to methods for making polyphosphate compositions that overcome these drawbacks.

SUMMARY OF THE INVENTION

This summary is provided to introduce a selection of concepts in a simplified form that are further described below in the detailed description. This summary is not intended to identify required or essential features of the claimed subject matter. Nor is this summary intended to be used to limit the scope of the claimed subject matter.

Processes for producing polyphosphate composition are disclosed and described herein. For example, a first process for producing a polyphosphate composition can comprise (a) continuously introducing a phosphate compound into a polymerization vessel, (b) polymerizing the phosphate compound at a temperature in a range from about 250 to about 450° C. for a time period sufficient to form the polyphosphate composition, and (c) continuously discharging the polyphosphate composition from the polymerization vessel. The polyphosphate composition can comprise at least about 8 wt. % of a polyphosphate and less than or equal to about 35 wt. % of the phosphate compound.

A second process for producing a polyphosphate composition consistent with aspects of this invention can comprise (a) continuously introducing an aqueous slurry containing from about 5 wt. % to about 50 wt. % of a phosphate compound into a polymerization vessel, (b1) evaporating water from the aqueous slurry in a first zone of the polymerization vessel, (b2) polymerizing the phosphate compound in a second zone of the polymerization vessel at a temperature in a range from about 250 to about 450° C. for a time period sufficient to form the polyphosphate composition, and (c) continuously discharging the polyphosphate composition from the polymerization vessel. The polyphosphate composition can comprise at least about 8 wt. % of a polyphosphate and less than or equal to about 35 wt. % of the phosphate compound.

Illustrative and non-limiting examples of phosphate compounds that can be polymerized as described herein include ammonium phosphate, melamine phosphate, melamine magnesium phosphate, and melamine zinc phosphate; therefore, the resultant polyphosphate can include an ammonium polyphosphate, a melamine polyphosphate, a melamine poly(magnesium phosphate), and a melamine poly(zinc phosphate).

Both the foregoing summary and the following detailed description provide examples and are explanatory only. Accordingly, the foregoing summary and the following detailed description should not be considered to be restrictive. Further, features or variations may be provided in addition to those set forth herein. For example, certain aspects may be directed to various feature combinations and sub-combinations described in the detailed description.

BRIEF DESCRIPTION OF THE FIGURES

The following figures form part of the present specification and are included to further demonstrate certain aspects of the present invention. The invention may be better understood by reference to one or more of these figures in combination with the detailed description and examples.

DEFINITIONS

Figure 1:
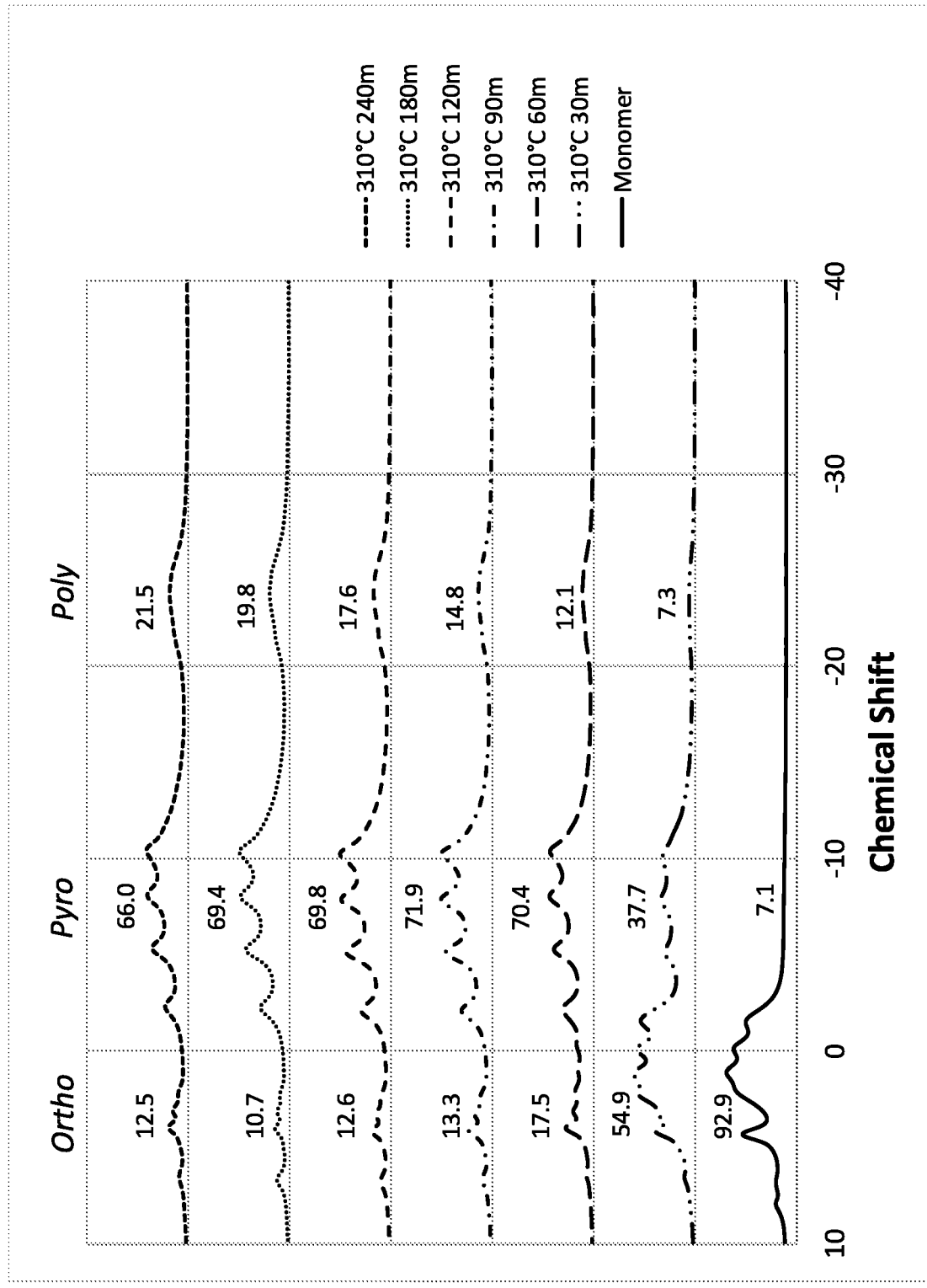
FIG. 1 presents a plot of the $^{31}$P MAS NMR spectra of melamine zinc phosphate monomer and polyphosphate compositions produced at a constant temperature in Example 1.

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, 2nd Ed (1997), can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Herein, features of the subject matter are described such that, within particular aspects, a combination of different features can be envisioned. For each and every aspect and each and every feature disclosed herein, all combinations that do not detrimentally affect the designs, compositions, processes, or methods described herein are contemplated and can be interchanged, with or without explicit description of the particular combination. Accordingly, unless explicitly recited otherwise, any aspect or feature disclosed herein can be combined to describe inventive designs, compositions, processes, or methods consistent with the present disclosure.

While compositions and methods are described herein in terms of "comprising" various components or steps, the compositions and methods also can "consist essentially of" or "consist of" the various components or steps, unless stated otherwise.

The terms "a," "an," and "the" are intended to include plural alternatives, e.g., at least one, unless otherwise specified.

Generally, groups of elements are indicated using the numbering scheme indicated in the version of the periodic table of elements published in *Chemical and Engineering News*, 63(5), 27, 1985. In some instances, a group of elements can be indicated using a common name assigned to the group; for example, alkali metals for Group 1 elements, alkaline earth metals for Group 2 elements, and so forth.

Although any methods and materials similar or equivalent to those described herein can be used in the practice or testing of the invention, the typical methods and materials are herein described.

All publications and patents mentioned herein are incorporated herein by reference for the purpose of describing and disclosing, for example, the constructs and methodologies that are described in the publications, which might be used in connection with the presently described invention.

Several types of ranges are disclosed in the present invention. When a range of any type is disclosed or claimed, the intent is to disclose or claim individually each possible number that such a range could reasonably encompass, including end points of the range as well as any sub-ranges and combinations of sub-ranges encompassed therein. As a representative example, the amount of the phosphate compound in an aqueous slurry can be in certain ranges in various aspects of this invention. By a disclosure that the aqueous slurry can contain from about 5 wt. % to about 50 wt. % of a phosphate compound, the intent is to recite that the amount of the phosphate compound can be any amount within the range and, for example, can be equal to about 5 wt. %, about 10 wt. %, about 15 wt. %, about 20 wt. %, about 25 wt. %, about 30 wt. %, about 35 wt. %, about 40 wt. %, about 45 wt. %, or about 50 wt. %. Additionally, the amount of the phosphate compound can be within any range from about 5 wt. % to about 50 wt. % (for example, from about 10 wt. % to about 30 wt. %), and this also includes any combination of ranges between about 5 wt. % and about 50 wt. %. Further, in all instances, where "about" a particular value is disclosed, then that value itself is disclosed. Thus, the disclosure of an amount of a phosphate compound in a range from about 5 wt. % to about 50 wt. % also discloses a phosphate compound range from 5 wt. % to 50 wt. % (for example, from 10 wt. % to 30 wt. %), and this also includes any combination of ranges between 5 wt. % and 50 wt. %. Likewise, all other ranges disclosed herein should be interpreted in a manner similar to this example.

The term "about" means that amounts, sizes, formulations, parameters, and other quantities and characteristics are not and need not be exact, but may be approximate including being larger or smaller, as desired, reflecting tolerances, conversion factors, rounding off, measurement errors, and the like, and other factors known to those of skill in the art. In general, an amount, size, formulation, parameter or other quantity or characteristic is "about" or "approximate" whether or not expressly stated to be such. The term "about" also encompasses amounts that differ due to different equilibrium conditions for a composition resulting from a particular initial mixture. Whether or not modified by the term "about," the claims include equivalents to the quantities. The term "about" can mean within 10% of the reported numerical value, preferably within 5% of the reported numerical value.

DETAILED DESCRIPTION OF THE INVENTION

The continuous processes for producing polyphosphate compositions that are disclosed herein offer several advantages over conventional stationary batch operations. In addition to higher operational efficiency and cost effectiveness, these continuous processes also produce polyphosphate compositions with improved product consistency, which is due in part to the continuous rotation and mixing/agitation within the polymerization vessel, an example of which is a rotary kiln. Also beneficially, these processes have improved quality control over the compositional breakdown (monomer, dimer, polymer) within the polyphosphate composition, such that the thermal stability of the composition within a polymer-based flame retardant formulation can be designed with certainty.

Further, the disclosed continuous processes are not limited to solid or powdered phosphate monomers. Beneficially, water-based slurries of the phosphate compounds can be used directly in the polymerization process, eliminating the need for an expensive and time-consuming drying step.

Processes for Preparing Polyphosphate Compositions

Disclosed herein are processes for producing a polyphosphate composition. A first process for producing a polyphosphate composition can comprise (or consist essentially of, or consist of) (a) continuously introducing a phosphate compound into a polymerization vessel, (b) polymerizing the phosphate compound at a temperature in a range from about 250 to about 450° C. for a time period sufficient to form the polyphosphate composition, and (c) continuously discharging the polyphosphate composition from the polymerization vessel. A second process for producing a polyphosphate composition consistent with aspects of this invention can comprise (or consist essentially of, or consist of) (a) continuously introducing an aqueous slurry containing from about 5 wt. % to about 50 wt. % of a phosphate compound into a polymerization vessel, (b1) evaporating water from the aqueous slurry in a first zone of the polymerization vessel, (b2) polymerizing the phosphate compound in a second zone of the polymerization vessel at a temperature in a range from about 250 to about 450° C. for a time period sufficient to form the polyphosphate composition, and (c) continuously discharging the polyphosphate composition from the polymerization vessel. The polyphosphate compositions in the first process and the second process can comprise at least about 8 wt. % of a polyphosphate and less than or equal to about 35 wt. % of the phosphate compound.

Generally, the features of the first process and the second process (e.g., the phosphate compound, the process conditions under which step (b) or step (b1) and (b2) are performed, and the components and/or features of the polyphosphate composition, among others) are independently described herein, and these features can be combined in any combination to further describe the disclosed first process and second process. Additionally, any polyphosphate composition produced in accordance with the first process or the second process is encompassed herein.

Referring now to step (a) of the first process for producing a polyphosphate composition, a phosphate compound can be continuously introduced into a polymerization vessel. Generally, in the first process, the phosphate compound can be in solid form, e.g., a solid phosphate compound containing a maximum of about 12 wt. % water/moisture. In most circumstances, the amount of entrained moisture in the solid phosphate compound can be less than or equal to about 10 wt. %, less than or equal to about 5 wt. %, or less than or equal to about 2 wt. %. In some aspects, the phosphate compound used in step (a) of the first process can be a free-flowing solid or powder.

In step (b) of the first process, the phosphate compound can be polymerized at a temperature in a range from about 250 to about 450° C. for a time period sufficient to form the polyphosphate composition. In one aspect, the temperature can be in a range from about 280° C. to about 420° C., while in another aspect, the temperature can be in a range from about 300° C. to about 400° C., and in yet another aspect, the temperature can be in a range from about 320° C. to about 420° C. In these and other aspects, these temperature ranges also are meant to encompass circumstances where the polymerization to form the polyphosphate composition is conducted at a series of different temperatures, instead of at a single fixed temperature, falling within the respective ranges.

Step (b) can be conducted for any suitable period of time, generally for a time period sufficient to form the polyphosphate composition. As would be readily recognized, higher polymerization temperatures may require shorter times and lower temperatures may require longer times; thus, the time period in step (b) can vary significantly. Nonetheless, the average residence time in the polymerization vessel typically ranges from about 30 min to about 300 min; alternatively, from about 45 min to about 180 min; or alternatively, from about 60 min to about 120 min.

The prevailing pressure in step (b) is not particularly limited, but in some aspects, step (b) can be conducted at a pressure in a range from ambient pressure to about 100 psig (689 kPag), from ambient pressure to about 60 psig (414 kPag), or from about 5 psig to about 60 psig (34 kPag to 414 kPag).

In step (c), the polyphosphate composition can be continuously discharged from the polymerization vessel. The components of the polyphosphate composition and their relative amounts are discussed further hereinbelow.

Optionally, the amount of the polyphosphate in the polyphosphate composition (that is discharged from the polymerization vessel) can be monitored, and the polymerization process conditions can be controlled accordingly. For instance, the first process can further comprise the steps of (i) determining (or measuring) the amount of the polyphosphate in the polyphosphate composition, and (ii) adjusting the temperature and/or the time period in step (b) based on the amount of the polyphosphate in the polyphosphate composition. In such aspects, a target or desired amount of the polyphosphate in the composition can be efficiently maintained by controlling polymerization temperature, average residence time, and the like.

Likewise, and optionally, the amount of the phosphate compound in the polyphosphate composition (that is discharged from the polymerization vessel) can be monitored, and the polymerization process conditions can be controlled accordingly. For instance, the first process can further comprise the steps of (I) determining the amount of the phosphate compound in the polyphosphate composition, and (II) adjusting the temperature and/or the time period in step (b) based on the amount of the phosphate compound in the polyphosphate composition. In such aspects, a target or desired amount of the phosphate in the composition can be efficiently maintained (and a target or desired amount of phosphate conversion can be efficiently maintained) by controlling polymerization temperature, average residence time, and the like.

Referring now to the second process for producing a polyphosphate composition, an aqueous slurry containing from about 5 wt. % to about 50 wt. % of a phosphate compound can be continuously introduced into a polymerization vessel in step (a). The amount of the phosphate compound present in the aqueous slurry often ranges from about 5 wt. % to about 50 wt. %. More often, the aqueous slurry contains an amount of the phosphate compound in one or more of the following representative ranges: from about 5 wt. % to about 40 wt. %, from about 8 wt. % to about 25 wt. %, from about 10 wt. % to about 40 wt. %, or from about 10 wt. % to about 30 wt. %, of the phosphate compound.

In step (b1) of the second process, water can be evaporated water from the aqueous slurry in a first zone of the polymerization vessel, while in step (b2), the phosphate compound can be polymerized in a second zone of the polymerization vessel at a temperature in a range from about 250 to about 450° C. for a time period sufficient to form the polyphosphate composition. Thus, it is envisioned that the polymerization vessel can have two or more zones, and these zones can have independent temperature control.

The temperature in step (b2) of the second process can be the same as that described hereinabove for step (b) of the first process. Thus, in some aspects, the (polymerization) temperature in step (b2) can range from about 280° C. to about 420° C., from about 300° C. to about 400° C., or from about 320° C. to about 420° C. The evaporation conditions in step (b1) are not particularly limited, so long as the water in the aqueous slurry can be removed to allow for sufficient polymerization downstream in the second zone of the polymerization vessel. Typical evaporation temperatures in the first zone can include from about 300° C. to about 800° C., from about 400° C. to about 700° C., or from about 500° C. to about 800° C. In these and other aspects, these evaporation temperature ranges also are meant to encompass circumstances where the evaporation process is conducted at a series of different temperatures, instead of at a single fixed temperature, falling within the respective ranges.

The prevailing pressures in step (b1) and step (b2) are not particularly limited, but in some aspects, steps (b1) and (b2) can be conducted, independently, at a pressure in a range from ambient pressure to about 100 psig (689 kPag), from ambient pressure to about 60 psig (414 kPag), or from about 5 psig to about 60 psig (34 kPag to 414 kPag). To improve the evaporation rate in step (b1), it is also contemplated that step (b1) can be conducted at a suitable sub-atmospheric pressure.

As with the first process, the average residence time in the second process can vary significantly based on the process conditions used in step (b1) and step (b2). Nonetheless, the average residence time in the polymerization vessel typically ranges from about 1 hr to about 8 hr; alternatively, from about 2 hr to about 5 hr; or alternatively, from about 1.5 hr to about 3 hr. Likewise, the relative amount of time in the first zone and the second zone is not particularly limited, but can vary significantly based on the process conditions used and the amount of water in the feed stream to the polymerization vessel. In one aspect, the ratio of a first average residence time in the first zone to a second average residence time in the second zone (first:second) can be from about 1:10 to about 5:1, while in another aspect, the ratio can be from about 1:5 to about 3:1, and in yet another aspect, the ratio can be from about 1:3 to about 1:1.

In step (c) of the second process, the polyphosphate composition can be continuously discharged from the polymerization vessel. The components of the polyphosphate composition and their relative amounts are discussed further hereinbelow.

Optionally, and similar to the first process, the amount of the polyphosphate in the polyphosphate composition (that is discharged from the polymerization vessel) in the second process can be monitored, and the evaporation and polymerization process conditions can be controlled accordingly. For instance, the second process can further comprise the steps of (i) determining (or measuring) the amount of the polyphosphate in the polyphosphate composition, (ii) adjusting evaporation conditions in step (b1), the temperature in step (b2), and/or the time period in step (b2) based on the amount of the polyphosphate in the polyphosphate composition. In such aspects, a target or desired amount of the polyphosphate in the composition can be efficiently maintained by controlling evaporation conditions (e.g., evaporation temperature), polymerization temperature, average residence time, and the like.

Likewise, and optionally, the amount of the phosphate compound in the polyphosphate composition (that is discharged from the polymerization vessel) in the second process can be monitored, and the evaporation and polymerization process conditions can be controlled accordingly. For instance, the second process can further comprise the steps of (I) determining the amount of the phosphate compound in the polyphosphate composition, and (II) adjusting evaporation conditions in step (b1), the temperature in step (b2), and/or the time period in step (b2) based on the amount of the phosphate compound in the polyphosphate composition. In such aspects, a target or desired amount of the phosphate in the composition can be efficiently maintained (and a target or desired amount of phosphate conversion can be efficiently maintained) by controlling evaporation conditions, polymerization temperature, average residence time, and the like.

For the first process and the second process, any polymerization vessel suitable for continuous polymerization and formation of the polyphosphate composition can be used. For instance, a rotary kiln can be used, a vertical kiln can be used, or a spiral kiln can be used. The vessel can have one zone or two or more zones, and in the latter case, each zone can have independent temperature control. The polymerization vessel can be configured for any suitable amount of mixing or agitation during evaporation and/or polymerization; therefore, in some aspects, the polymerization vessel can be rotated.

Generally, a rotary kiln contains a cylinder, a tube, or a drum that can rotate along its axis. The cylinder is set at a slight angle in order to allow gravity to assist in moving material through the rotating cylinder. There are two generic types of rotary kilns that differ based on how the heat is introduced to process the material inside the cylinder: direct-fired and indirect-fired. In a direct-fired kiln, hot gases pass inside and along the cylinder, sometimes in the same direction as the process material (co-current), but usually in the opposite direction (countercurrent). The hot gases can be generated by a flame inside the kiln. In an indirect-fired kiln, material is heated through contact with the inner surface of the cylinder, which can be heated from the outside by electrical means or by hot gases.

After discharge from the polymerization vessel—after step (c)—the first process and the second process can further comprise a step of milling the polyphosphate composition. This milling step can be used reduce an average particle size of the polyphosphate composition, or can be used to reduce agglomeration of the polyphosphate composition, or to both reduce the average particle size and to reduce agglomeration.

Beneficially, the first process and the second process of this invention do not require or utilize a drying step. This can result in significant savings both in terms of time and cost reduction.

Phosphate Compounds and Polyphosphate Compositions

The polyphosphate compositions produced via the first process and the second process described herein generally contain monomer species (phosphate compounds), dimers (pyrophosphates), and polymers (polyphosphates). Broadly, the polyphosphate composition can contain at least about 8 wt. % of a polyphosphate and less than or equal to about 35 wt. % of the phosphate compound. These weight percentage values are based only on phosphorus-containing compounds in the polyphosphate composition, i.e., the presence of impurities, solvents/diluents, etc., are excluded from the determination of the weight percentages of individual components of the polyphosphate composition.

In an aspect, at least about 8 wt. % of the polyphosphate composition is a polyphosphate, and in some instances, the polyphosphate composition contains at least about 15 wt. %, at least about 20 wt. %, or at least about 25 wt. % of a polyphosphate (of any number of repeating units equal to or greater than 3). Illustrative and non-limiting ranges for the polyphosphate content of the polyphosphate composition can include from about 15 wt. % to about 60 wt. %, from about 15 wt. % to about 50 wt. %, or from about 20 wt. % to about 40 wt. %, of the polyphosphate.

In an aspect, a maximum of about 35 wt. % of the polyphosphate composition is the phosphate compound. In some aspects, the polyphosphate composition contains less than or equal to about 25 wt. % or less than or equal to about 20 wt. %, of the phosphate compound. In other aspects, the polyphosphate composition contains less than or equal to about 15 wt. % or less than or equal to about 10 wt. %, of the phosphate compound.

In an aspect, a significant portion of the polyphosphate composition can be a pyrophosphate compound. While not being limited thereto, the polyphosphate composition can contain from about 35 wt. % to about 80 wt. % of the pyrophosphate compound; alternatively, from about 45 wt. % to about 75 wt. % of the pyrophosphate compound; or alternatively, from about 55 wt. % to about 75 wt. % of the pyrophosphate compound.

Suitable phosphate compounds that can be used in the first process and the second process to produce a polyphosphate composition can include a (metal) (phosphate), a (N-containing cation) (phosphate), a (N-containing cation) (metal) (phosphate), and the like, or combinations thereof; alternatively, a (metal) (phosphate); alternatively, a (N-containing cation) (phosphate); or alternatively, a (N-containing cation) (metal) (phosphate).

For the (metal) (phosphate), the metal can be zinc, molybdenum, calcium, magnesium, aluminum, copper, barium, tin, tungsten, iron, or nickel, although not limited thereto. Thus, the (metal) (phosphate)—the phosphate compound—can be zinc phosphate, molybdenum phosphate, calcium phosphate, magnesium phosphate, aluminum phosphate, copper phosphate, barium phosphate, tin phosphate, tungsten phosphate, iron phosphate, and/or nickel phosphate.

For the (N-containing cation) (phosphate), the N-containing cation can be ammonium, arginine, lysine, histidine, melamine, or diethanolamine, although not limited thereto. Thus, the (N-containing cation) (phosphate)—the phosphate compound—can be ammonium phosphate, arginine phosphate, lysine phosphate, histidine phosphate, melamine phosphate, and/or diethanolamine phosphate.

For the (N-containing cation) (metal) (phosphate), any combination of metals and N-containing cations can be used to describe the phosphate compound. Illustrative and non-limiting examples include melamine zinc phosphate, melamine copper phosphate, ammonium tin phosphate, ammonium zinc phosphate, and the like, as well as combination thereof. Although not limited thereto, the (N-containing cation) (metal) (phosphate) can be prepared by process that involves combining (or reacting) a mixture of water and the N-containing cation with a mixture of water, phosphoric acid, and a (metal) oxide to form the phosphate compound. Instead of the (metal) oxide, a (metal) hydroxide can be used. Thus, melamine zinc phosphate can be prepared by combining (or reacting) a mixture of water and melamine with a mixture of water, phosphoric acid, and zinc oxide (or zinc hydroxide) to form melamine zinc phosphate.

Consistent with aspects of the first process and the second process of this invention, the phosphate compound can comprise ammonium phosphate, and the polyphosphate can comprise an ammonium polyphosphate, in one representative example. The phosphate compound can comprise melamine phosphate, and the polyphosphate can comprise a melamine polyphosphate, in another representative example. The phosphate compound can comprise melamine zinc phosphate, and the polyphosphate can comprise a melamine poly(zinc phosphate), in yet another representative example.

The polyphosphate compositions can have unexpectedly high thermal stability, for instance, as characterized by a decomposition onset temperature on a TGA (thermogravimetric analysis) curve that falls within a range from about 290° C. to about 360° C.; additionally or alternatively, characterized by a temperature at a weight loss of 2% that falls within a range from about 290° C. to about 360° C.; or additionally or alternatively, characterized by a temperature at a weight loss of 5% that falls within a range from about 290° C. to about 360° C.

In one aspect, the polyphosphate composition can be characterized by a decomposition onset temperature (or a temperature at a weight loss of 2%, or a temperature at a weight loss of 5%) on a TGA curve in a range from about 300° C. to about 350° C. In another aspect, the polyphosphate composition can be characterized by a decomposition onset temperature (or a temperature at a weight loss of 2%, or a temperature at a weight loss of 5%) on a TGA curve in a range from about 310° C. to about 340° C.

Polymer-Based Flame Retardant Formulations

This invention is also directed to, and encompasses, any compositions, formulations, composites, and articles of manufacture that contain any of the polyphosphate compositions disclosed herein (and their respective characteristics or features, such as the TGA temperatures, amount of phosphate compound, amount of a polyphosphate, and so forth). In a particular aspect of this invention, a polymer composition is disclosed, and in this aspect, the polymer composition can comprise any suitable polymer (one or more than one) and any of the polyphosphate compositions disclosed herein.

In some aspects, the polymer can comprise an a polyethylene (e.g., an ethylene homopolymer and/or an ethylene/α-olefin copolymer), a polypropylene, an ethylene vinyl acetate copolymer (EVA), an epoxy resin, a polyamide (e.g., Nylon 66, optionally with glass-fiber reinforcement), a polybutylene terephthalate (PBT), or a polyurethane, and the like, as well as combinations thereof.

In other aspects, the polymer can comprise one of more of a polyolefin, a polylactic acid, a polyurethane, a polyester base, and/or a polyamide. Polyolefins can include polyethylene, namely low-density polyethylene (LDPE), linear low-density polyethylene (LLDPE), high-density polyethylene (HDPE), and polypropylene (PP). Storage and transport containers can be made of high density polypropylene (HDPE) and impact modified polypropylene.

While not being limited thereto, the weight ratio of polymer:polyphosphate composition often can range from about 100:1 to about 100:40 in the polymer composition. Illustrative and non-limiting weight ratios of polymer:polyphosphate composition can include the following ranges: from about 100:1 to about 100:20, from about 100:1 to about 100:5, from about 100:5 to about 100:40, from about 100:5 to about 100:30, from about 100:5 to about 100:20, from about 100:2 to about 100:25, or from about 100:2 to about 100:15. Other appropriate ranges for the weight ratio of polymer:polyphosphate compositions are readily apparent from this disclosure.

Articles of manufacture can be formed from and/or can comprise any of the polymer compositions described herein. In an aspect, the article of manufacture can comprise a (polymeric) sheet or film. In another aspect, the article of manufacture can comprise a pipe or a molded article. In yet another aspect, the article of manufacture can comprise a wire or cable. For instance, the polymer composition can be used as a wire and cable insulation layer or used in wire and cable jacketing.

Another suitable article of manufacture can be a PCB (printed circuit board) comprising an epoxy resin. The polyphosphate composition can be used as a flame retardant for a halogen-free epoxy resin, which can be used for manufacturing semi-cured prepregs or resin-coated films, and also manufacturing metal clad laminates and printed circuit boards. The epoxy resin can comprise, for instance, a bisphenol A epoxy resin, bisphenol F epoxy resin, bisphenol S epoxy resin, phenol novolac epoxy resin, cresol novolac epoxy resin, bisphenol A novolac epoxy resin, bisphenol F novolac epoxy resin, diphenylethylene epoxy resin, epoxy resin having triazine skeleton, epoxy resin having fluorene skeleton, triphenylmethane epoxy resin, biphenyl epoxy resin, xylylene epoxy resin, biphenyl aralkyl epoxy resin, naphthalene epoxy resin, dicyclopentadiene epoxy resin, alicyclic epoxy resin, and the like, as well as combinations thereof. Other appropriate articles of manufacture and end-use applications are readily apparent from this disclosure.

EXAMPLES

The invention is further illustrated by the following examples, which are not to be construed in any way as imposing limitations to the scope of this invention. Various other aspects, modifications, and equivalents thereof which, after reading the description herein, may suggest themselves to one of ordinary skill in the art without departing from the spirit of the present invention or the scope of the appended claims.

The degree of polymerization of phosphate polymers or compositions was determined by solid-state $^{31}$P NMR analysis. The $^{31}$P NMR spectra were acquired on a Redstone (Tecmag) NMR spectrometer using direct polarization-Magic Angle Spinning at $^{31}$P frequency of 147.085 MHz. Approximately 250 mg of a powdered sample was packed into a 7 mm diameter cylindrical (zirconia) rotor fitted with a Kel-F cap and spun at 7 kHz in a Doty Scientific magic-angle spinning probe. The presence of spinning sidebands is an artifact of MAS. High rpm spinning (7 kHz) can eliminate the interference with peak resonances of sidebands.

Further, a direct-polarization sequence, optimized to obtain quantitative data, was used with a pulse-length of 5 µs (30°) and a pulse delay of 60 sec. Additionally, in order to obtain quantitative data using DP-MAS techniques, the time delay between two consecutive NMR pulses used should be much greater than the spin lattice relaxation times. A total of 48 to 60 transients were collected for each sample, and the spectra were processed with 25 to 50 Hz line broadening. The data processing and calculation of integrated peak areas were carried out off-line using an Acorn NMR NUTS software package. The identification of functional groups by $^{31}$P NMR was based on their chemical shift relative to an external phosphoric acid standard. Chemical shift values were used to represent differences in resonance frequency of different P compound classes (such as ortho, pyro and poly phosphates). These values are dimensionless and are expressed in parts per million (ppm) relative to the phosphoric acid standard set at 0 ppm.

TGA measurements were performed on a TA Instrument TGA Q-500. A 5 mg to 20 mg sample was placed in a platinum pan and loaded onto a microbalance inside the TGA furnace. The sample was initially equilibrated at 30° C. with a $N_2$ flow rate of 60 mL/min, and the sample heated to 1000° C. at a temperature ramping rate of 20° C./min. Weight loss was recorded during the process. The decomposition onset temperature referred to herein is an "extrapolated" onset temperature, which is a reproducible temperature calculation described in ASTM E2550-11. The "extrapolated" onset temperature, as the name implies, was determined by calculating the point of intersection of two straight extrapolated lines: one was extrapolated from the initial baseline when there was no weight loss, and the other was the first tangent of the initial weight loss trending line. From the TGA data, the temperatures at a weight loss of 2 wt. % and a weight loss of 5 wt. % also were determined.

Example 1

Polymerization of Melamine Zinc Phosphate as a Function of Residence Time at a Constant Temperature The solid phosphate compound was fed into the upper end of a cylinder of an indirect-fired electric rotary kiln. As the kiln rotated, the compound gradually moved down toward the lower end, and with agitation and mixing provided by a three-pronged lifter inside the cylinder or lifting flights fixed on the inside surface of the rotating tube. The temperature and average residence time of the compound inside the heated zones of the cylinder determines the degree of polymerization of the polyphosphate. The average residence time (t) in the heated cylinder can be determined from Equation (1):

$$t = \frac{1.77 * L * \sqrt{\theta}}{m * \phi * \omega}$$

where L is the heated length of the cylinder in feet, θ is the angle of repose of monomer powders in degrees, m is the slope of the cylinder along its rotating axis in degrees, Ø is the inner diameter of the cylinder in feet, and ω is the speed of rotation of the cylinder in rpm. Above certain minimum rotary kiln temperatures necessary for polymerization, an inverse relationship between residence time and temperature exists; lower temperatures can be combined with longer residence times to achieve equivalent degrees of polymerization to that of higher temperatures and shorter residence times.

The operating temperature was controlled by a built-in temperature controller which sends an electric current signal to a SCR (silicon-controlled rectifier). A transformer reduced the voltage from the SCR to values that enabled a heating element to maintain the desired temperatures.

For Example 1, the rotary kiln was set at a fixed temperature of 310° C. Average residence times were adjusted according to Equation (1) by varying the slope of the cylinder (m) and/or speed of rotation (ω) to achieve the values from 30 min to 120 min in 30-min intervals, and from 120 min to 240 min in 60-min intervals. Samples were taken at each average residence time and analyzed with solid state $^{31}$P NMR. The NMR spectra are summarized in FIG. 1.

In the solid state $^{31}$P MAS NMR spectra, peaks from the phosphate monomers are at 10 to 0 ppm, peak from pyro-phosphates are located at 0 to −11 ppm, and peaks from polyphosphates are at −21 to −24 ppm on the chemical shift axis. FIG. 1 demonstrates that the degree of polymerization increases as the residence time increases at a fixed polymerization temperature (in this case, 310° C.). As the residence time increased, the amount of the phosphate monomer decreased and the amount of polyphosphate increased (values in wt. %).

Figure 2:
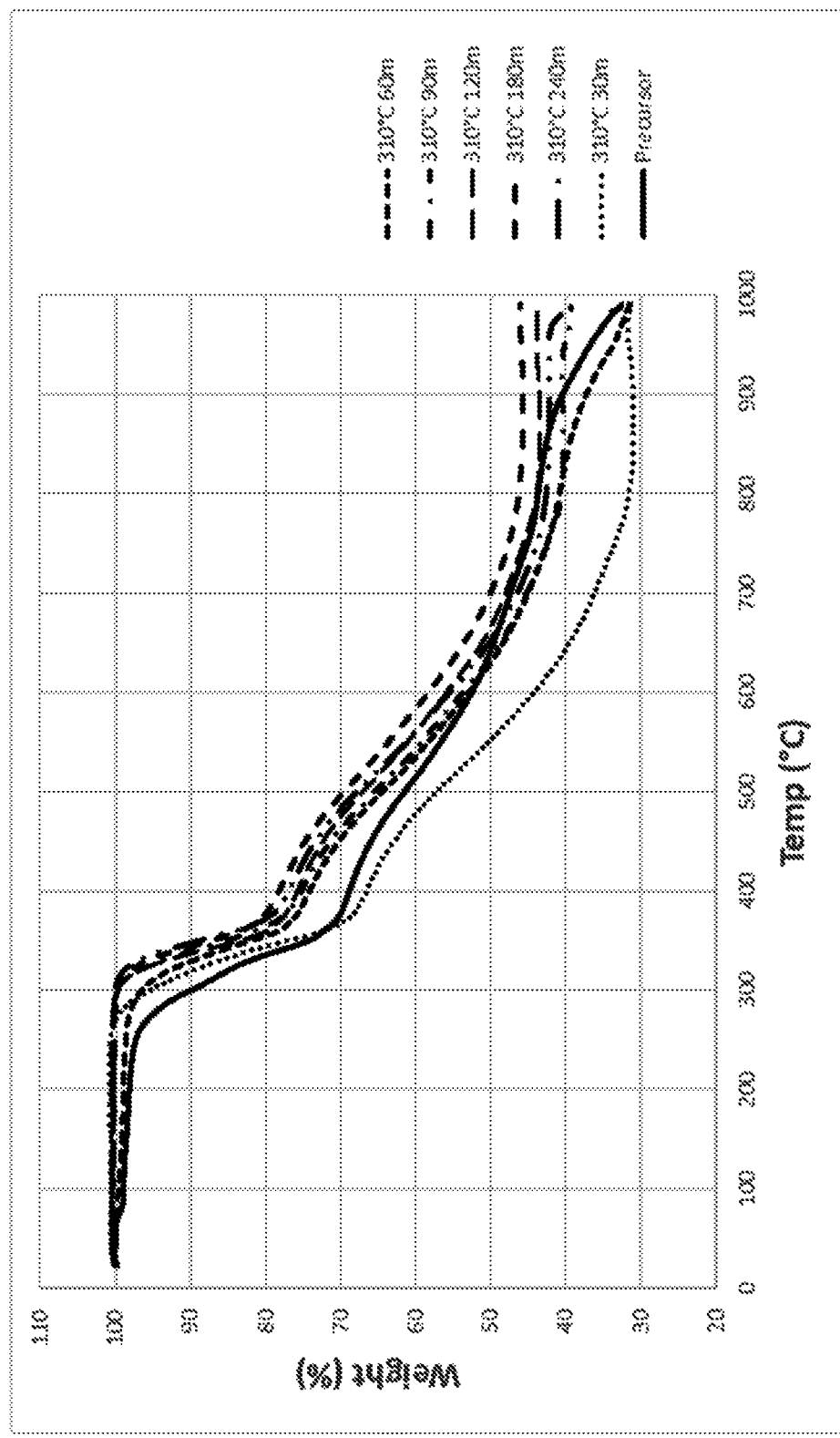
FIG. 2 presents thermogravimetric analysis (TGA) plots of melamine zinc phosphate monomer and polyphosphate compositions produced at a constant temperature in Example 1.

For these polyphosphate compositions, FIG. 2 illustrates the TGA plots and Table I summarizes the decomposition onset temperature, the temperature at a weight loss of 2%, and the temperature at a weight loss of 5%, determined using TGA (thermogravimetric analysis). At the fixed polymerization temperature of 310° C., the thermal stability of polyphosphate compositions (prepared from melamine zinc phosphate) generally increased as the residence time increased. Compositions with higher levels of polyphosphate resulted in superior thermal stability.

TABLE I

Thermal stability comparison as a function of residence time at 310° C.

| Residence Time | Decomposition Onset Temperature (° C.) | Temperature at 2% Weight Loss (° C.) | Temperature at 5% Weight Loss (° C.) |
| --- | --- | --- | --- |
| Monomer | 272.9 | 250.6 | 287.7 |
| 30 min | 302.1 | 291.9 | 302.5 |
| 60 min | 314.9 | 318.6 | 331.6 |
| 90 min | 314.7 | 314.1 | 326.1 |
| 120 min | 315.5 | 314.5 | 325.4 |
| 180 min | 321.0 | 319.7 | 331.9 |
| 240 min | 325.0 | 325.0 | 335.9 |

Example 2

Polymerization of Melamine Zinc Phosphate as a Function of Temperature at a Fixed Average Residence Time Example 2 was conducted in the same manner as Example 1, except that the temperature was varied and the residence time was fixed. The parameters of the rotary kiln were set to result in a fixed residence time of 90 min. The test temperatures were 310° C. and 320° C. Samples were taken at these temperatures and analyzed with solid state $^{31}$P NMR. The NMR spectra are summarized in FIG. 3.

Figure 3:
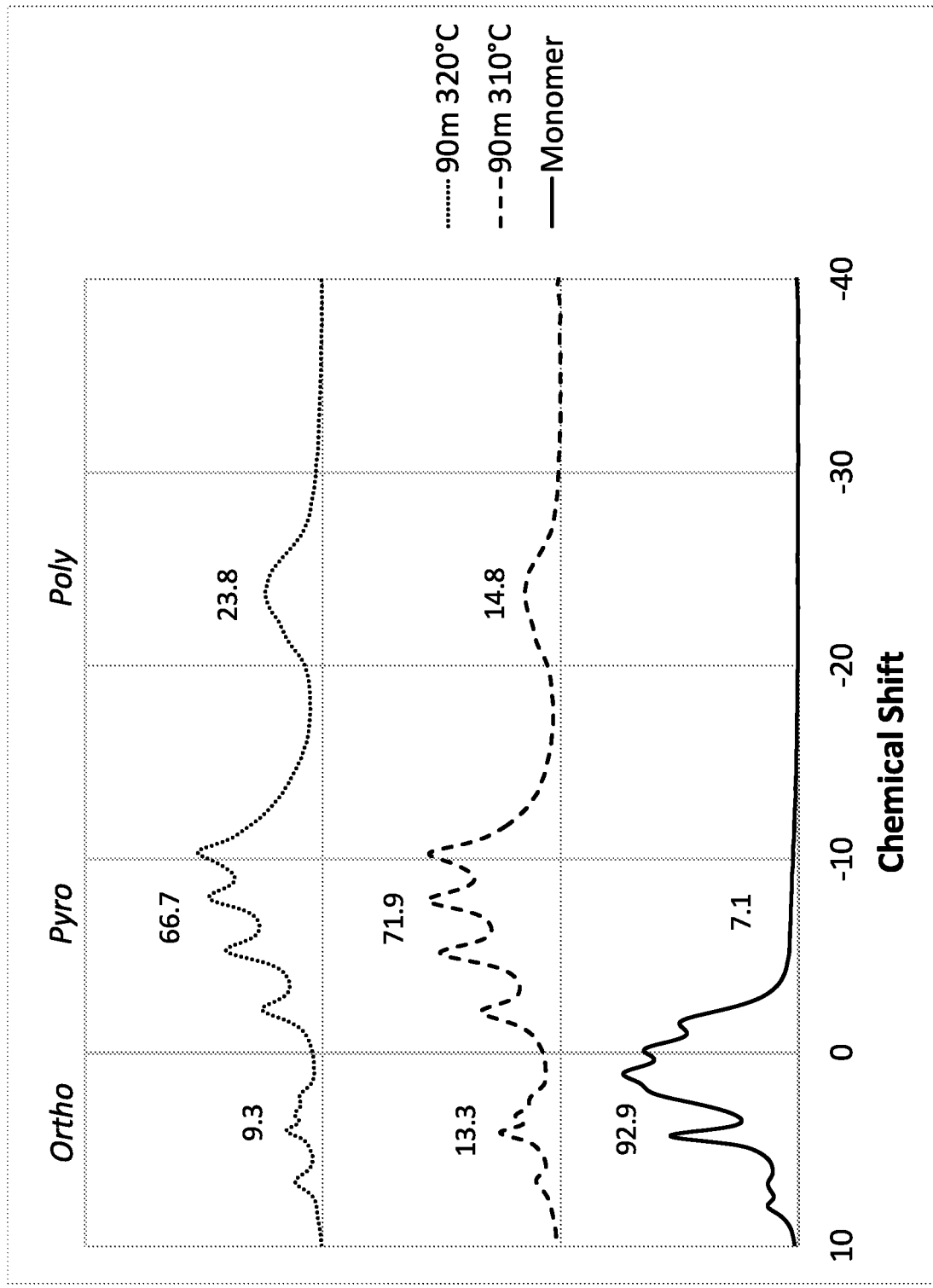
FIG. 3 presents a plot of the $^{31}$P MAS NMR spectra of melamine zinc phosphate monomer and polyphosphate compositions produced at a constant residence time in Example 2.

FIG. 3 demonstrates that the degree of polymerization increases as the temperature increases at a fixed residence time (in this case, 90 min). As the temperature increased, the amount of the phosphate monomer decreased and the amount of polyphosphate increased (values in wt. %).

For these polyphosphate compositions, Table II summarizes the decomposition onset temperature, the temperature at a weight loss of 2%, and the temperature at a weight loss of 5%, determined using TGA (thermogravimetric analysis). At the fixed residence time of 90 min, the thermal stability of polyphosphate compositions (prepared from melamine zinc phosphate) increased as the polymerization temperature increased. Higher levels of polyphosphate resulted in superior thermal stability.

TABLE II

Thermal stability comparison as a function of temperature at 90 min

| Temperature (° C.) | Decomposition Onset Temperature (° C.) | Temperature at 2% Weight Loss (° C.) | Temperature at 5% Weight Loss (° C.) |
| --- | --- | --- | --- |
| Monomer | 272.9 | 250.6 | 287.7 |
| 310 | 314.7 | 314.1 | 326.1 |
| 320 | 317.0 | 320.5 | 328.9 |

Example 3

Flame Retardant Performance of Polyphosphate Compositions Prepared from Melamine Zinc Phosphate Ethylene vinyl acetate (EVA) formulations were produced with (Example 3A) no polyphosphate composition, (Example 3B) 10 wt. % of the polyphosphate composition produced in Example 2 at 320° C. and 90 min, and (Example 3C) 10 wt. % of a polyphosphate composition similar to Example 3B, except produced at 320° C. and 30 min. Table III summarizes the formulations (DuPont Elvax 265 is manufactured by DuPont; Vertex 100 is magnesium hydroxide manufactured by J. M. Huber Corporation; Viton Z 200 is a processing aid manufactured by Chemours; and Irganox 1010 is a sterically hindered phenolic antioxidant manufactured by BASF).

Figure 4:
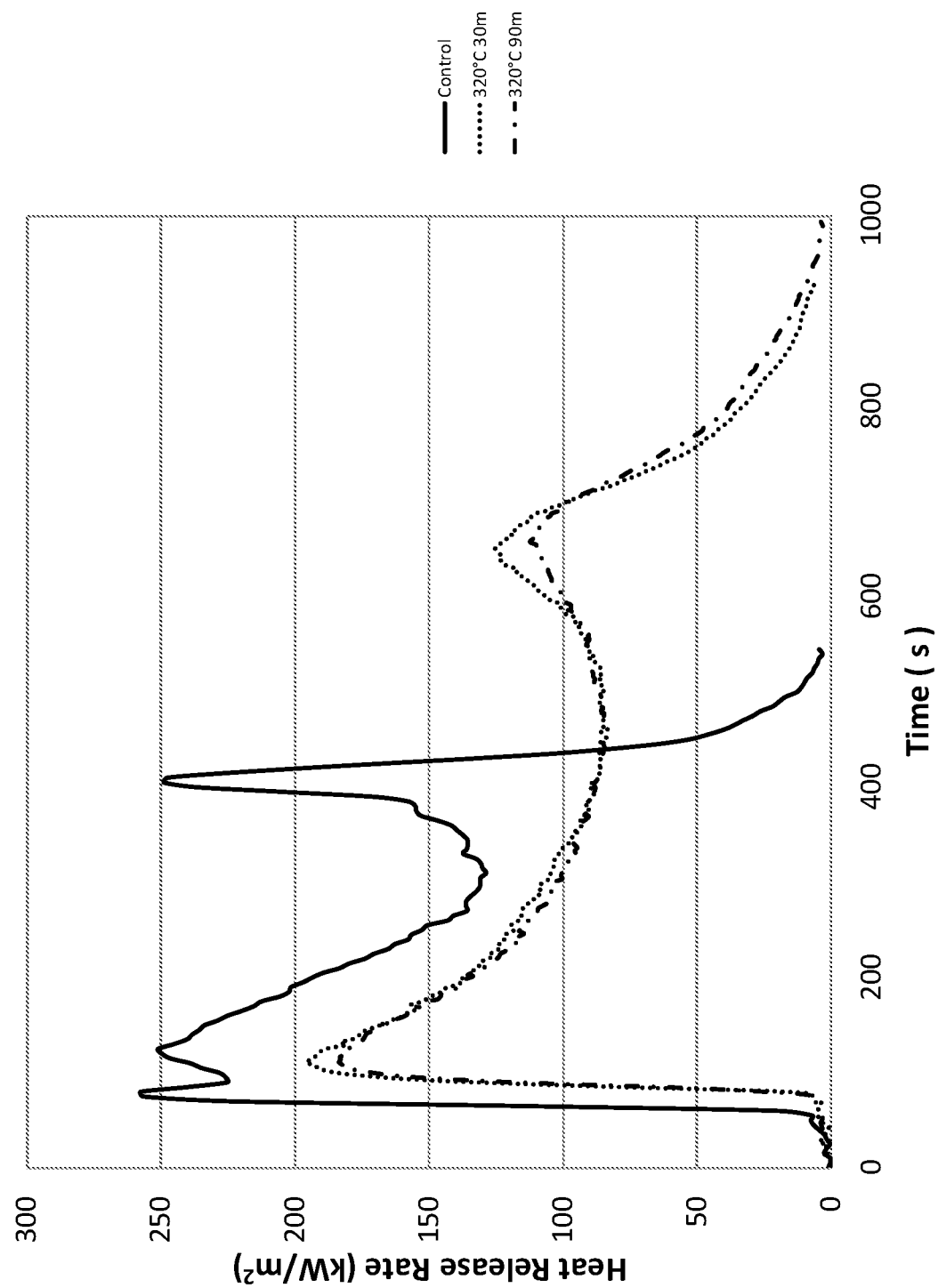
FIG. 4 presents plots of the heat release rate (HRR) curves for the flame retardant polymer compositions of Example 3.

FIG. 4 illustrates the heat release rate (HRR) curves for the three polymer compositions of Example 3. Cone calorimetry measurements were made according to ASTM E 1354 at 35 kW/m² on 3 mm thick compression molded plates. Unexpectedly, the formulations of Examples 3B-3C (which contained a polyphosphate composition) had both a longer time to ignition and a lower peak heat release rate (peak of the curve).

TABLE III

Formulations for Example 3 (wt. %)

| Example | 3A | 3B | 3C |
| --- | --- | --- | --- |
| DuPont Elvax 265 | 29.1 | 29.1 | 29.1 |
| Fusabond E BM 410D | 6 | 6 | 6 |
| Vertex 100 | 64 | 54 | 54 |
| Polyphosphate Composition | 0 | 10 | 10 |
| Viton Z-200 | 0.2 | 0.2 | 0.2 |
| Calcium Stearate | 0.5 | 0.5 | 0.5 |
| Irganox 1010 | 0.2 | 0.2 | 0.2 |
| Total | 100 | 100 | 100 |

The invention is described above with reference to numerous aspects and specific examples. Many variations will suggest themselves to those skilled in the art in light of the above detailed description. All such obvious variations are within the full intended scope of the appended claims. Other aspects and/or features of the invention can include, but are not limited to, the following (which are described as "comprising" but, alternatively, can "consist essentially of" or "consist of"):

Aspect 1. A process for producing a polyphosphate composition, the process comprising:
(a) continuously introducing a phosphate compound into a polymerization vessel;
(b) polymerizing the phosphate compound at a temperature in a range from about 250 to about 450° C. for a time period sufficient to form the polyphosphate composition; and
(c) continuously discharging the polyphosphate composition from the polymerization vessel, wherein the polyphosphate composition comprises:
at least about 8 wt. % of a polyphosphate; and
less than or equal to about 35 wt. % of the phosphate compound.

Aspect 2. The process defined in aspect 1, wherein the (solid) phosphate compound contains an amount of water/moisture in any range disclosed herein, e.g., a maximum of about 12 wt. %, a maximum of about 10 wt. %, a maximum of about 5 wt. %, or a maximum of about 2 wt. %.

Aspect 3. The process defined in aspect 1 or 2, wherein the temperature in step (b) is in any suitable range or any range disclosed herein, e.g., from about 280° C. to about 420° C., from about 300° C. to about 400° C., or from about 320° C. to about 420° C.

Aspect 4. The process defined in any one of aspects 1-3, wherein step (b) is conducted at a pressure in any suitable range or any range disclosed herein, e.g., from ambient to about 100 psig (689 kPag), or from about 5 to about 60 psig (34 to 414 kPag).

Aspect 5. The process defined in any one of aspects 1-4, wherein an average residence time in the polymerization vessel is a time period in any suitable range or any range disclosed herein, e.g., from about 30 min to about 300 min, from about 45 min to about 180 min, or from about 60 min to about 120 min.

Aspect 6. The process defined in any one of aspects 1-5, further comprising:
(i) determining the amount of the polyphosphate in the polyphosphate composition; and (ii) adjusting the temperature and/or the time period in step (b) based on the amount of the polyphosphate in the polyphosphate composition.

Aspect 7. The process defined in any one of aspects 1-6, further comprising:
(I) determining the amount of the phosphate compound in the polyphosphate composition; and (II) adjusting the temperature and/or the time period in step (b) based on the amount of the phosphate compound in the polyphosphate composition.

Aspect 8. A process for producing a polyphosphate composition, the process comprising:
(a) continuously introducing an aqueous slurry containing from about 5 wt. % to about 50 wt. % of a phosphate compound into a polymerization vessel;
(b1) evaporating water from the aqueous slurry in a first zone of the polymerization vessel;
(b2) polymerizing the phosphate compound in a second zone of the polymerization vessel at a temperature in a range from about 250 to about 450° C. for a time period sufficient to form the polyphosphate composition; and (c) continuously discharging the polyphosphate composition from the polymerization vessel, wherein the polyphosphate composition comprises:
   at least about 8 wt. % of a polyphosphate; and
   less than or equal to about 35 wt. % of the phosphate compound.

Aspect 9. The process defined in aspect 8, wherein the aqueous slurry contains an amount of the phosphate compound in any range disclosed herein, e.g., from about 5 wt. % to about 40 wt. %, from about 10 wt. % to about 40 wt. %, or from about 10 wt. % to about 30 wt. %, of the phosphate compound.

Aspect 10. The process defined in aspect 8 or 9, wherein the temperature in step (b2) is in any suitable range or any range disclosed herein, e.g., from about 280° C. to about 420° C., from about 300° C. to about 400° C., or from about 320° C. to about 420° C.

Aspect 11. The process defined in any one of aspects 8-10, wherein step (b1) is conducted at any suitable evaporation temperature or an evaporation temperature in any range disclosed herein, e.g., from about 300° C. to about 800° C., from about 400° C. to about 700° C., or from about 500° C. to about 800° C.

Aspect 12. The process defined in any one of aspects 8-11, wherein step (b1) and step (b2) independently are conducted at a pressure in any suitable range or any range disclosed herein, e.g., from ambient to about 100 psig (689 kPag), or from about 5 to about 60 psig (34 to 414 kPag).

Aspect 13. The process defined in any one of aspects 8-12, wherein an average residence time in the polymerization vessel is a time period in any suitable range or any range disclosed herein, e.g., from about 1 hr to about 8 hr, from about 2 hr to about 5 hr, or from about 1.5 hr to about 3 hr.

Aspect 14. The process defined in any one of aspects 8-13, wherein a ratio of a first average residence time in the first zone to a second average residence time in the second zone (first:second) is in any suitable range or any range disclosed herein, e.g., from about 1:10 to about 5:1, from about 1:5 to about 3:1, or from about 1:3 to about 1.1.

Aspect 15. The process defined in any one of aspects 8-14, further comprising:
   (i) determining the amount of the polyphosphate in the polyphosphate composition; and (ii) adjusting evaporation conditions in step (b1), the temperature in step (b2), and/or the time period in step (b2) based on the amount of the polyphosphate in the polyphosphate composition.

Aspect 16. The process defined in any one of aspects 8-15, further comprising:
   (I) determining the amount of the phosphate compound in the polyphosphate composition; and (II) adjusting evaporation conditions in step (b1), the temperature in step (b2), and/or the time period in step (b2) based on the amount of the phosphate compound in the polyphosphate composition.

Aspect 17. The process defined in any one of aspects 1-16, wherein the polymerization vessel is any suitable vessel or any vessel disclosed herein, e.g., a rotary kiln, a vertical kiln, or a spiral kiln.

Aspect 18. The process defined in any one of aspects 1-17, further comprising after step (c), a step of milling the polyphosphate composition to reduce an average particle size of the polyphosphate composition and/or to reduce agglomeration of the polyphosphate composition.

Aspect 19. The process defined in any one of aspects 1-18, wherein the polyphosphate composition comprises an amount of the polyphosphate in any range disclosed herein, e.g., at least about 20 wt. %, from about 15 wt. % to about 60 wt. %, from about 15 wt. % to about 50 wt. %, or from about 20 wt. % to about 40 wt. %, of the polyphosphate.

Aspect 20. The process defined in any one of aspects 1-19, wherein the polyphosphate composition comprises an amount of the phosphate compound in any range disclosed herein, e.g., a maximum of about 25 wt. %, a maximum of about 20 wt. %, a maximum of about 15 wt. %, or a maximum of about 10 wt. %, of the phosphate compound.

Aspect 21. The process defined in any one of aspects 1-20, wherein the polyphosphate composition further comprises an amount of a pyrophosphate compound in any range disclosed herein, e.g., from about 35 wt. % to about 80 wt. %, from about 45 wt. % to about 75 wt. %, or from about 55 wt. % to about 75 wt. %, of the pyrophosphate compound.

Aspect 22. The process defined in any one of aspects 1-21, wherein the phosphate compound comprises:
   a (metal) (phosphate),
   a (N-containing cation) (phosphate),
   a (N-containing cation) (metal) (phosphate), or
   a combination thereof.

Aspect 23. The process defined in aspect 22, wherein the N-containing cation is ammonium, arginine, lysine, histidine, melamine, or diethanolamine.

Aspect 24. The process defined in aspect 22, wherein the metal is zinc, molybdenum, calcium, magnesium, aluminum, copper, barium, tin, tungsten, iron, or nickel.

Aspect 25. The process defined in any one of aspects 22-24, wherein the phosphate compound comprises the (metal) (phosphate).

Aspect 26. The process defined in any one of aspects 22-24, wherein the phosphate compound comprises the (N-containing cation) (phosphate).

Aspect 27. The process defined in any one of aspects 22-24, wherein the phosphate compound comprises the (N-containing cation) (metal) (phosphate).

Aspect 28. The process defined in any one of aspects 1-23, wherein the phosphate compound comprises ammonium phosphate, and the polyphosphate comprises an ammonium polyphosphate.

Aspect 29. The process defined in any one of aspects 1-23, wherein the phosphate compound comprises melamine phosphate, and the polyphosphate comprises a melamine polyphosphate.

Aspect 30. The process defined in any one of aspects 1-24, wherein the phosphate compound comprises melamine zinc phosphate, and the polyphosphate comprises a melamine poly(zinc phosphate).

Aspect 31. The process defined in any one of aspects 1-24, further comprising, prior to step (a), the step of reacting (or combining) a mixture of water and the N-containing cation with a mixture of water, phosphoric acid, and a (metal) oxide (or a (metal) hydroxide) to form the phosphate compound.

Aspect 32. The process defined in any one of aspects 1-24, further comprising, prior to step (a), the step of reacting (or combining) a mixture of water and melamine with a mixture of water, phosphoric acid, and zinc oxide to form melamine zinc phosphate.

Aspect 33. The process defined in any one of aspects 1-32, wherein the process does not comprise a drying step.

Aspect 34. The process defined in any one of aspects 1-33, wherein the polyphosphate composition has (or is characterized by) a decomposition onset temperature on a TGA (thermogravimetric analysis) curve (or a temperature at a weight loss of 2% on a TGA curve, or a temperature at a weight loss of 5% on a TGA curve) in any range disclosed herein, e.g., from about 290° C. to about 360° C., from about 300° C. to about 350° C., or from about 310° C. to about 340° C.

We claim:

1. A process for producing a polyphosphate composition, the process comprising:
   (a) continuously introducing an aqueous slurry containing from about 5 wt. % to about 50 wt. % of a phosphate compound into a polymerization vessel;
   (b1) evaporating water from the aqueous slurry in a first zone of the polymerization vessel;
   (b2) polymerizing the phosphate compound in a second zone of the polymerization vessel at a temperature in a range from about 250 to about 450° C. for a time period sufficient to form the polyphosphate composition; and
   (c) continuously discharging the polyphosphate composition from the polymerization vessel, wherein the polyphosphate composition comprises:
   at least about 8 wt. % of a polyphosphate; and
   less than or equal to about 35 wt. % of the phosphate compound.

2. The process of claim 1, wherein the aqueous slurry contains from about 5 wt. % to about 40 wt. % of the phosphate compound.

3. The process of claim 1, wherein:
   step (b1) is conducted at an evaporation temperature in a range from about 300° C. to about 800° C.; and
   the temperature in step (b2) is in a range from about from about 300° C. to about 400° C.

4. The process of claim 1, wherein a ratio of a first average residence time in the first zone to a second average residence time in the second zone (first:second) is in a range from about 1:10 to about 5:1.

5. The process of claim 1, wherein the process does not comprise a drying step.

6. The process of claim 1, further comprising:
   (i) determining an amount of the polyphosphate in the polyphosphate composition; and
   (ii) adjusting evaporation conditions in step (b1), the temperature in step (b2), and/or the time period in step (b2) based on the amount of the polyphosphate in the polyphosphate composition.

7. The process of claim 1, further comprising:
   (I) determining an amount of the phosphate compound in the polyphosphate composition; and
   (II) adjusting evaporation conditions in step (b1), the temperature in step (b2), and/or the time period in step (b2) based on the amount of the phosphate compound in the polyphosphate composition.

8. The process of claim 1, wherein the polymerization vessel is a rotary kiln, a vertical kiln, or a spiral kiln.

9. The process of claim 1, further comprising after step (c), a step of milling the polyphosphate composition to reduce an average particle size of the polyphosphate composition and/or to reduce agglomeration of the polyphosphate composition.

10. The process of claim 1, wherein the polyphosphate composition comprises:
    from about 15 wt. % to about 60 wt. % of the polyphosphate;
    less than or equal to about 20 wt. %, of the phosphate compound; and
    from about 35 wt. % to about 80 wt. % of a pyrophosphate compound.

11. The process of claim 1, wherein the phosphate compound comprises:
    a (metal) (phosphate),
    a (N-containing cation) (phosphate),
    a (N-containing cation) (metal) (phosphate), or
    a combination thereof.

12. The process of claim 1, wherein:
    the phosphate compound comprises ammonium phosphate, melamine phosphate, melamine magnesium phosphate, and/or melamine zinc phosphate; and
    the polyphosphate comprises an ammonium polyphosphate, a melamine polyphosphate, a melamine poly (magnesium phosphate), and/or a melamine poly(zinc phosphate).

13. The process of claim 1, wherein the polyphosphate composition has a temperature at a weight loss of 2% on a TGA (thermogravimetric analysis) curve and/or a temperature at a weight loss of 5% on a TGA (thermogravimetric analysis) curve from about 300° C. to about 350° C.

14. A process for producing a polyphosphate composition, the process comprising:
    (a) continuously introducing a phosphate compound into a polymerization vessel, the phosphate compound comprising melamine magnesium phosphate and/or melamine zinc phosphate;
    (b) polymerizing the phosphate compound at a temperature in a range from about 250 to about 450° C. for a time period sufficient to form the polyphosphate composition; and
    (c) continuously discharging the polyphosphate composition from the polymerization vessel, wherein the polyphosphate composition comprises:
    at least about 8 wt. % of a polyphosphate, the polyphosphate comprising a melamine poly(magnesium phosphate) and/or a melamine poly(zinc phosphate); and
    less than or equal to about 35 wt. % of the phosphate compound.

15. The process of claim 14, wherein the phosphate compound contains less than or equal to about 10 wt. % moisture.

16. The process of claim 14, wherein the temperature in step (b) is in a range from about 300° C. to about 400° C.

17. The process of claim 14, further comprising:
    (i) determining an amount of the polyphosphate in the polyphosphate composition; and
    (ii) adjusting the temperature and/or the time period in step (b) based on the amount of the polyphosphate in the polyphosphate composition.

18. The process of claim 14, further comprising:
    (I) determining an amount of the phosphate compound in the polyphosphate composition; and
    (II) adjusting the temperature and/or the time period in step (b) based on the amount of the phosphate compound in the polyphosphate composition.

19. The process of claim 14, wherein the polymerization vessel is a rotary kiln, a vertical kiln, or a spiral kiln.

20. The process of claim 14, further comprising after step (c), a step of milling the polyphosphate composition to reduce an average particle size of the polyphosphate composition and/or to reduce agglomeration of the polyphosphate composition.

21. The process of claim 14, wherein the polyphosphate composition comprises:
    from about 15 wt. % to about 60 wt. % of the polyphosphate;
    less than or equal to about 20 wt. %, of the phosphate compound; and
    from about 35 wt. % to about 80 wt. % of a pyrophosphate compound.

22. The process of claim 14, wherein the polyphosphate composition has a temperature at a weight loss of 2% on a TGA (thermogravimetric analysis) curve and/or a temperature at a weight loss of 5% on a TGA (thermogravimetric analysis) curve from about 300° C. to about 350° C.

* * * * *